United States Patent
Legallais

(10) Patent No.: US 9,475,308 B2
(45) Date of Patent: Oct. 25, 2016

(54) PRINTING SYSTEM AND METHOD FOR APPLYING A DESIGN TO AT LEAST ONE FINGERNAIL/TOENAIL SURFACE

(71) Applicant: Nailae Technology Limited, Offshore Incorporations Centre Victoria (SC)

(72) Inventor: Alexandre Legallais, Aix-en-Provence (FR)

(73) Assignee: Nailae Technology Limited, Centre Victoria (SC)

(*) Notice: Subject to any disclaimer, the term of this patent is extended or adjusted under 35 U.S.C. 154(b) by 0 days.

(21) Appl. No.: 14/782,012

(22) PCT Filed: May 12, 2014

(86) PCT No.: PCT/FR2014/051094
§ 371 (c)(1),
(2) Date: Oct. 2, 2015

(87) PCT Pub. No.: WO2015/018987
PCT Pub. Date: Feb. 12, 2015

(65) Prior Publication Data
US 2016/0052295 A1 Feb. 25, 2016

(30) Foreign Application Priority Data

Aug. 7, 2013 (FR) ..................................... 13 57853

(51) Int. Cl.
*B41J 3/407* (2006.01)
*B41J 29/38* (2006.01)
*G06F 3/12* (2006.01)
*G06K 15/02* (2006.01)
*H04N 1/00* (2006.01)

(52) U.S. Cl.
CPC ................. *B41J 3/407* (2013.01); *B41J 29/38* (2013.01); *G06F 3/1285* (2013.01); *G06K 15/021* (2013.01); *H04N 1/00265* (2013.01)

(58) Field of Classification Search
CPC ....................................................... B41J 3/407
USPC ....... 358/1.8, 1.6, 1.1; 132/73, 200; 118/300
See application file for complete search history.

(56) References Cited

U.S. PATENT DOCUMENTS 5,931,166 A * 8/1999 Weber .................... A45D 34/04
132/200
6,067,996 A * 5/2000 Weber .................... A45D 34/04
132/200

(Continued)

FOREIGN PATENT DOCUMENTS

EP 1204340 5/2002

*Primary Examiner* — Jacky X Zheng
(74) *Attorney, Agent, or Firm* — Pearl Cohen Zedek Latzer Baratz LLP

(57) ABSTRACT

The invention relates to a system comprising an apparatus (1) for applying a design to a fingernail/toenail surface (SO), comprising: —a server (5) integrating a database (50), —terminals (6a, 6b, 6c, 6d) generating a design in the form of digital data, each terminal communicating with the server (5), so that said data generated are transmitted to said server, —the server (5) stores in a hierarchized manner the data received, said data being stored in memory areas (5a, 5b, 5c, 5d), which memory areas are accessible by password and/or identifier, —a touchpad (4) connected to the apparatus, which pad comprises a means for communicating with the server (5) and accessing one of the memory areas (5a, 5b, 5c, 5d) and downloading the stored data, which downloaded data correspond to the design to be applied to the fingernail/toenail surface (SO).

11 Claims, 2 Drawing Sheets

(56) References Cited

U.S. PATENT DOCUMENTS

| | | | |
|---|---|---|---|
| 9,357,825 B2 * | 6/2016 | Yamasaki | A45D 29/00 |
| 2006/0087686 A1 | 4/2006 | Anderson et al. | |
| 2012/0287183 A1 * | 11/2012 | Bitoh | A45D 29/00 347/3 |
| 2013/0019799 A1 | 1/2013 | Bitoh | |

* cited by examiner

PRINTING SYSTEM AND METHOD FOR APPLYING A DESIGN TO AT LEAST ONE FINGERNAIL/TOENAIL SURFACE

CROSS-REFERENCE TO RELATED APPLICATIONS

This application is a National Phase Application of PCT International Application No. PCT/FR2014/051094, entitled "PRINTING SYSTEM AND METHOD FOR APPLYING A DESIGN TO AT LEAST ONE FINGERNAIL/TOENAIL SURFACE", International Filing Date May 12, 2014, published on Feb. 12, 2015 as International Publication No. WO 2015/018987, which in turn claims priority from French Patent Application No. 1357853, filed Aug. 7, 2013, all of which are incorporated herein by reference in their entirety.

TECHNICAL FIELD OF THE INVENTION

The invention relates to a system and a printing method for applying a design on at least one nail surface.

The invention relates to the technical field of manicure, and more particularly manicure apparatuses, of the printer type, making it possible to apply complex, customized, detailed, multicolored designs on nails.

PRIOR ART

Patent documents U.S. Pat. No. 6,067,996 (WEBER), US 2013/019799 (BITHO) and EP 1.204.340 (PEARL TECHNOLOGY) describe apparatuses making it possible to apply a design on at least one nail surface.

This type of apparatus comprises a guide making it possible to position at least one nail surface on a print head generally mounted on a rail and able to be displaced. An optical device of the camera type makes it possible to acquire an image of the nail surface. When the user has selected a design, a control unit controls the displacement of the print head according to the image of the nail surface acquired and according to said design, in such a way that said head applies said design on the nail surface.

This type of apparatus is in general satisfactory, in particular because it makes it possible to apply on the surface of the nail, a design in a very precise manner. The user can therefore adorn her nails with original, multishape and multicolored designs, which it is not possible to consider obtaining manually. However, the number of designs made available to the user is generally restricted, as they are part of a database (or "library") of which the content is limited and controlled.

SUMMARY

The purpose of the invention is to overcome this state. In particular, an objective of the invention is to increase rapidly and simply the number of designs able to be made available to users.

The solution proposed by the invention is a printing system comprising at least one apparatus for applying a design to at least one nail surface, said apparatus comprising:
  means for positioning at least one nail surface,
  an optical device for acquiring an image of the nail surface,
  a print head,
  means for displacing the print head in order to apply a design on the nail surface,
  a control unit integrating:
    a means for communicating with the optical device,
    a computer application comprising instructions for controlling the means of displacement according to the image of the nail surface acquired and according to the design, in such a way as to direct the print head so that it applies said design on the nail surface.

The remarkable characteristics of the invention are as follows:
  the system comprises:
    at least one remote server of the apparatus, said server integrating at least one database wherein digital data is recorded,
    a series of terminals belonging to a user community, each said terminal integrating at least one means for generating a design in the form of digital data, each said terminal further comprising a means for communicating, by the intermediary of an internet network, with the remote server, in such a way that said data generated is transmitted to said remote server,
  the remote server integrates a computer application comprising instructions to store in a hierarchical way the digital data received, said data being stored in memory zones of the database, said memory zones are associated with each of the users of the community and can be accessed via password and/or identifier,
  the control unit has the form of a touch-screen tablet connected in a removable manner to the apparatus, said tablet comprises a means for communicating, by the intermediary of an internet network, with the remote server, in such a way that said tablet can access at least one of the memory zones and download the digital data which is stored therein, said downloaded data corresponding to the design to be applied on the nail surface.

Thanks to the invention, the user community can customize and enrich to an unlimited extent and in real time the database of the remote server. Each user can then connect, via her touch-screen tablet, to the remote server and have access to all or a portion of the designs recorded in this database. In relation to the aforementioned apparatuses of prior art, the "designs" database is much more substantial.

Other advantageous characteristics of the invention are listed hereinbelow, each of these characteristics can be considered alone or in combination with the remarkable characteristics defined hereinabove:
  The touch-screen tablet advantageously displays the digital data contained in the memory zone of the remote server, in the form of designs which can be accessed in a digital library.
  The touch-screen tablet can incorporate a computer application comprising instructions for: controlling the optical device in order to acquire, in the form of digital data, an image of the nail surface whereon the design is applied; and transferring to the remote server, the digital data acquired.
  The remote server advantageously integrates a computer application comprising instructions for storing the digital data received, either in the memory zone associated with the user of the touch-screen tablet connected to the apparatus, or in each of the memory zones, or in the memory zones of users of the community selected beforehand.
  The apparatus is preferably associated with a unique identifier, and after the application of a design on a nail surface, the touch-screen tablet transmits to the remote server information integrating this unique identifier, in such a way that said remote server can account for the number of designs applied by said apparatus.

The touch-screen tablet is preferably associated with a unique identifier, and after the application of a design on a nail surface, the tablet transmitting to the remote server information integrating this unique identifier, in such a way that said remote server can account for the number of designs downloaded by said tablet and applied by the apparatus.

The remote server preferably integrates a computer application comprising instructions for generating, at a predetermined regular time interval, an electronic invoice that takes into account the number of designs accounted for in this interval; the remote server further comprises a means for automatically transmitting the electronic invoice generated, to a paying organization.

The remote server can be connected to several apparatuses for applying a design on at least one nail surface.

Another aspect of the invention relates to a method for applying a design on at least one nail surface, comprising the steps consisting in:

positioning at least one nail surface on a print head of an apparatus, acquiring an image of the nail surface, displacing the print head according to the image of the nail surface acquired and according to the design, in such a way as to apply said design on the nail surface, generating several designs in the form of digital data, said designs being generated by a user community, transmitting this data to at least one remote server of the apparatus and storing it in a hierarchical way in memory zones each associated with each of the users of the community and which can be accessed via password and/or identifier, connecting in a removable manner a touch-screen tablet to the apparatus, said tablet acting as a control unit of said apparatus, accessing, from the tablet, at least one of the memory zones of the remote server and downloading the digital data that is stored therein, said data downloaded corresponding to the design to be applied on the nail surface.

DESCRIPTION OF THE FIGURES

Other advantages and characteristics of the invention shall appear better when reading the following description of a preferred embodiment, in reference to the annexed drawings, provided for the purposes of information and as non-restricted examples and wherein.

DETAILED DESCRIPTION

Figure 1:
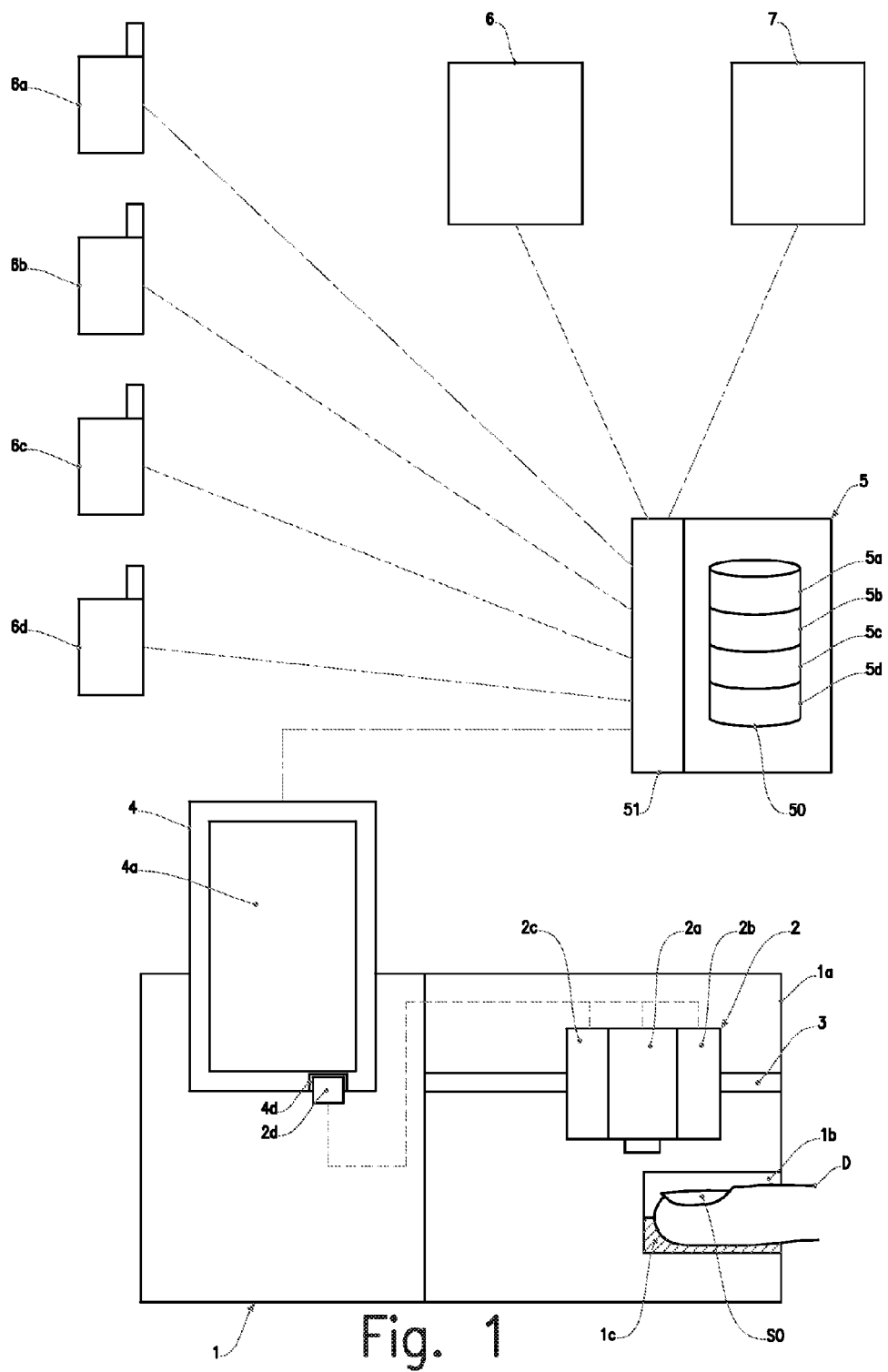
FIG. 1 shows a printing system in accordance with the invention.

FIG. 1 shows an apparatus 1 for applying a design on at least one nail surface SO. This apparatus 1 has for example the form of a printer for nails, of the type described in the aforementioned patent documents US 2013/019799 (BITHO) or EP 1.204.340 (PEARL TECHNOLOGY) to which those skilled in the art can refer.

More particularly, the apparatus 1 comprises a case 1a, of parallelepiped, oval, round or other shape, of which the front surface is provided with an opening 1b for the passage of at least one finger D of one hand of a user. The opening 1b can be dimensioned in order to allow for the passage of a single finger, or several fingers and in particular of all of the fingers of a hand of a user, and preferably of both hands (or feet).

The opening 1b opens into a housing located inside the case 1a, and wherein are positioned the finger or fingers D. This housing is provided with means 1c for positioning at least one nail surface SO. These means 1c have for example the form of a guide of the type described in U.S. Patent 2013/019799 (BITHO) in reference to the FIGS. 5A to 11 of said document, or in the form of prints of the type described in patent document EP 1.204.340 (PEARL TECHNOLOGY) in reference to the FIG. 1A or 4A of said document. The means for positioning 1c are configured in such a way as to position and maintain in position the nail surface SO in the direction of a printing device.

In the example of FIG. 1, the printing device comprises a carriage 2 mounted on rails 3. The carriage 2 is provided with a print head 2a and possibly an optical device 2b in order to acquire an image of the nail surface SO.

The print head 2a advantageously uses an ink jet method wherein ink is sprayed in fine droplets and ejected onto the nail surface SO. But other printing methods can be considered. The print head 2a is connected to an ink cartridge (not shown) and comprises for example a row of nozzles which sprays a black ink, a row of nozzles which sprays a cyan ink, a row of nozzles which sprays a magenta ink, and a row of nozzles which sprays a yellow ink, etc. The inks used are of the type known to those skilled in the art and adapted to be applied on the surface of a nail.

The optical device 2b has for example the form of a digital photograph cell or of a CCD camera located on the side or above the print head 2a and which makes it possible to scan the anatomy of the nail surface SO before, during or after the printing.

The rails 3 are arranged in such a way that the carriage 2 can be displaced at least in a horizontal plane, towards the right, towards the left, towards the front and towards the rear. Rails can also be provided arranged in such a way that the carriage 2 is displaced in a vertical plane, upwards and downwards. A motor 2c provides the displacement of the carriage 2 on the rails 3. In an alternative embodiment not shown, it can be considered to install the print head 2a on one side and the optical device 2b on the other side, each one on a motorized mobile carriage. In another alternative embodiment, the optical device 2b is fixed, with only the print head 2a being mobile and associated with the carriage 2.

A touch-screen tablet 4 acting as a control unit, is connected in a removable manner to the apparatus 1. In the sense of this invention, a touch-screen tablet means any portable computer terminal in the form of a tablet having for main interface a touch screen 4a (e.g.: IPad® or Samsung®), including Smartphones. In practice, the tablet 4 is provided with a rechargeable battery, a motherboard, one or several processors and a memory zone wherein are recorded various computer applications of which the instructions provide for the implementation of the various features mentioned in this description. The operating system is of the type known to those skilled in the art (e.g.: Android®, BlackBerry OS®, iOS®; Windows®; etc.).

The touch-screen tablet 4 is provided with a connector 4d cooperating with a complementary connector 2d installed on the apparatus 2, in such a way that data can be exchanged between said tablet and the elements of said apparatus. This can be a physical connection (e.g.: USB port or serial port or SD Card reader) or a wireless connection (e.g.: Wifi, Bluetooth). This connector authorizes in particular the tablet 4 to communicate with the optical device 2b and to generate instructions intended for the print head 2a and for the motor 2c. More particularly, when the nail surface SO is in position in the apparatus 1, the tablet 4 orders the displacement of the carriage 2 so that the optical device 2b acquires an image of said nail surface. Then, the tablet 4 can analyze the anatomy of the nail surface SO scanned and scale the design chosen beforehand by the user, in order to adjust it to said surface. The tablet 4 then controls the displacement of the print head 2a according to the image of the nail surface SO acquired and according to the design chosen, is such a way as to apply the latter on the nail surface.

In FIG. 1, at least one remote server 5, of the apparatus 1, integrates at least one database 50 wherein digital data is able to be recorded. Several remote servers can be used for the purposes of optimizing the archival and the securing of the data. In a well-known manner, a server 5 typically has the form of a computer provided with one or several processors 51 and with at least one memory wherein are recorded various computer applications of which the instructions provide for the implementation of the features mentioned hereinafter. The remote server 5 can be managed by one or several operators which are for example owners of the apparatuses 1. The term "remote server" must also be understood in the sense of this invention as a storage area known as a "Cloud".

A series of mobile or fixed terminals 6a, 6b, 6c, 6d belonging to a user community (for example the Facebook® community), communicate, by the intermediary of an internet network, with the remote server 5. In practice, the terminals 6a, 6b, 6c, 6d and the server 5 are each provided with an emitter/receiver that provide for this communication via a modem, an Ethernet connection, a Wifi connection, or other. In this way, data can transit from the terminals 6a, 6b, 6c, 6d to the remote server 5 and other data can transit from said server to said terminals. The data transiting between a terminal 6a, 6b, 6c, 6d and the remote server 5 is preferably exchanged though a secure internet connection of the HTTP-S type.

The terminals 6a, 6b, 6c, 6d can be touch-screen tablets, mobile telephones, apparatuses of the personal digital assistant type (PDA), apparatuses of the BlackBerry® type, fixed or portable PC computers, or any other communication terminal able to connect in an internet communications network. Each terminal 6a, 6b, 6c, 6d integrates at least one means for generating a design in the form of digital data. This can be for example a built-in camera apparatus or drawing software of the PAINT® type. In the sense of this invention "designs" means any pattern able to be printed on the nail surface SO: photograph, portrait, artistic design, stylized face figure of the smiley type, icon, logo, flag, text, any complex shape, etc. When the design is generated, the associated digital data is transmitted to the remote server 5, automatically, or as a response to a specific action from the user on her terminal, for example a pressing a dedicated key. The terminals 6a, 6b, 6c, 6d are preferably associated with a unique identifier making it possible to identify the user who generated the design. This identifier has for example the form of a string of numeric or alphanumeric characters.

When the remote server 5 receives this data, it stores it in a hierarchical way in memory zones 5a, 5b, 5c, 5d of the database 50. These memory zones 5a, 5b, 5c, 5d are associated with each of the users of the community and can be accessed via password and/or identifier. In practice, each user of the community has her own memory zone, said zone is indicated by a unique identifier which corresponds to that making it possible to identify the user who generated the design. When the digital data is transmitted by a terminal 6a, 6b, 6c, 6d, this data is advantageously associated with the identifier of said terminal and/or of its user. By analyzing all of the data received, the server 5 can as such extract the identifier and direct the digital data which is associated with it to the memory zone 5a, 5b, 5c, 5d assigned to the user of the terminal 6a, 6b, 6c, 6d who emitted said data. Each user can as such constitute in real time and in a practically unlimited way a library of designs that can be applied on a nail surface.

The tablet 4 connects automatically, via an Internet connection, to the server 5 so as to be able to access at least one of the memory zones 5a, 5b, 5c, 5d and download the digital data that is stored therein, said downloaded data corresponding to the design to be applied on the nail surface SO. To do this, as a response to the connection of the tablet 4, the remote server 5 can emit a request intended for said tablet, requesting a password and/or an identifier. The latter corresponds to the identifier mentioned previously in relation with the terminals 6a, 6b, 6c, 6d. The user of the tablet 4 keys in the information requested from said tablet and transmits it to the remote server 5. After verification of this information, the remote server 5 authorizes access to the memory zone 5a, 5b, 5c, 5d that corresponds to the identifier entered. This identifier can possibly be contained in an NFC card, in which case it suffices for the user to present this card in front of the tablet 4 in order to authorize this identification. The tablet 4 as such has access to all of the designs stored in the authorized memory zone. Each user (e.g.: "Julie") of the community can authorize one or several other users of said community (e.g.: "Marie" and "Bénédicte") to access her own memory zone. The remote server 5 grants in this case a specific right to "Marie" and "Bénédicte" so that they can access the data stored in the memory zone of "Julie". When "Marie" connects, via her tablet 4, to the remote server 5 and access to the database 5 is granted to her, said tablet not only has access to the data stored in the memory zone that is dedicated for her (for example the memory zone 5a) but also the memory zone of "Julie" (for example the memory zone 5b).

By connecting to the remote server 5, the tablet 4 displays on its screen 4a a digital library generated by said server. This library displays all of the designs associated with the digital data contained in the memory zone or zones 5a and/or 5b and/or 5c and/or 5d of which the access is authorized by the remote server 5.

Figure 2:
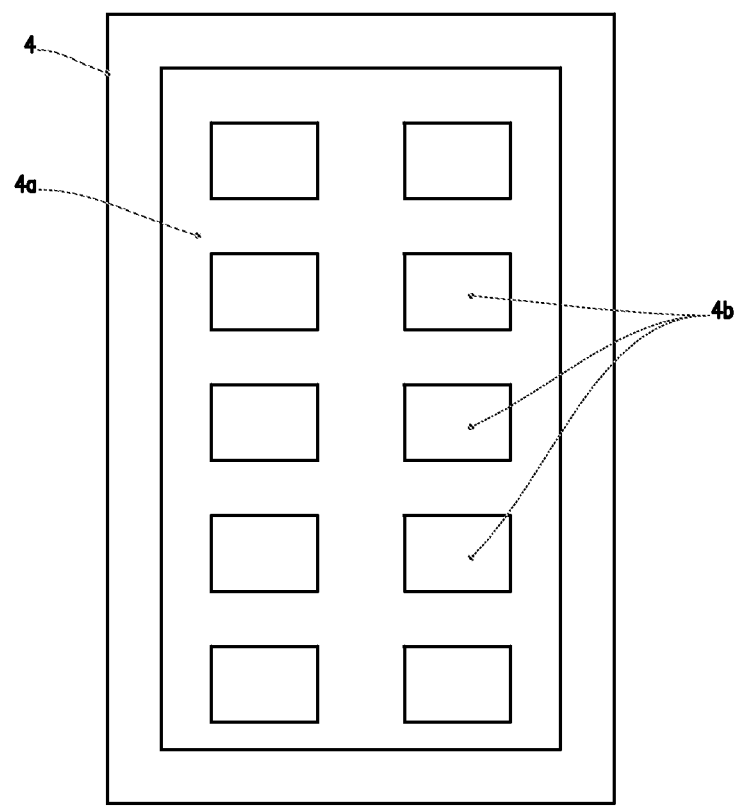
FIG. 2 shows an example of a digital library of designs displayed on the screen of a touch-screen tablet.

Referring to FIG. 2, the designs are displayed in the form of elements that can be selected 4b, for example icons that can be selected by pressing on a screen 4a. The selection of an element that can be selected 4b generates control information sent, from the tablet 4, to the remote server 5. The latter transfers to the tablet 4 all of the digital data corresponding to the selected designs, said data is as such downloaded onto said tablet. This downloading can occur as a response to receiving the control information by the server 5. The downloading can also occur beforehand, for example as early as the step of identification, in which case all of the data corresponding to the designs listed in the library is downloaded beforehand, but only that corresponding to the selected designs is activated. This downloaded data is now printing data taken into account in order to control the carriage 2 as explained previously in order to apply this design on the nail surface SO.

After the application of the selected design on the nail surface SO, a user may find it advantageous to share, with the other members of the community, a photograph of her nails thus decorated. Referring to the aforementioned example, "Marie" may want to transmit a photograph of her nails to "Julie" and "Bénédicte" and even to the entire community. To do this, the tablet 4 generates an instruction to control the optical device 2b so that the latter acquires, in the form of digital data, an image of the nail surface SO whereon is applied the design. The tablet 4 then transfers to the remote server 5, the digital data acquired. The remote server 5 stores this data either in the memory zone associated with the user of the touch-screen tablet 4 connected to the apparatus 1 (for example the memory zone 5a dedicated to "Marie"), in each of the memory zones 5a, 5b, 5c, 5d, or in the memory zones of users of the community selected beforehand (for example the memory zone 5a dedicated to "Marie" and the memory zone 5c dedicated to "Bénédicte"). The user or users of the memory zones wherein is recorded the digital data acquired by the optical device 2b, can then download this data for applying the corresponding design on their nails.

The apparatus 1 is advantageously associated with a unique identifier, typically a string of numeric or alphanumeric characters. At the end of the application of a design on a nail surface SO, the tablet 4 generates an instruction to transmit to the remote server 5 information integrating this unique identifier. The remote server 5 is as such informed in real time that the apparatus 1 has carried out the application of a design on the nail surface SO and can account for the number of designs applied by said apparatus. The remote server 5 thus generates, at a predetermined regular time interval (for example daily, monthly, quarterly, or annually), an electronic invoice that takes into account the number of designs accounted for in this interval. As soon as it is generated, this invoice is then automatically transmitted to a paying organization 7 (FIG. 1) through a secure internet connection of the HTTP-S type. The paying organization 7 consists for example of a beauty institute wherein the apparatus 1 is installed.

In an alternative embodiment, it is the user of the tablet 4 who is invoiced. After the application of a design on a nail surface SO, the tablet 4 generates an instruction to transmit to the remote server 5 information integrating a unique identifier associated with said tablet. The remote server 5 can then account for the number of designs downloaded by said tablet and applied by the apparatus 1. As described in the previous paragraph, the remote server 5 generates an electronic invoice that takes into account the number of designs accounted for in a predetermined regular time interval, and automatically transmits it to a paying organization 6, which is in this case, the user of the tablet 4.

The tablet 4 can transfer to the remote server 5, other information concerning the operation of the apparatus 1 such as a breakdown or a low ink level in the cartridges. The remote server 5 can then inform a person to intervene in order to correct the problems observed and/or carry out maintenance. Furthermore, a developing organization 8 connected to the remote server 5, can check said server and update it on a regular basis.

The arrangement of the various elements of the system in the embodiments described hereinabove must not be understood as requiring such an arrangement in all of the implementations. In any case, it is understood that diverse modifications can be made to the system and to the method, without leaving the idea and the scope of the invention. In particular, the remote server 5 can be connected to several apparatuses similar to the apparatus 1 described hereinabove. Also, the digital data can be stored in several remote servers. The invention must furthermore be understood as covering the application of a design on the surface of an artificial nail intended to be glued onto a natural nail.

The invention claimed is:

1. Printing system comprising at least one apparatus for applying a design on at least one nail surface, said apparatus comprising:
   a guide or print to position at least one nail surface,
   an optical device for acquiring an image of the nail surface,
   a print head,
   a motor for displacing the print head in order to apply a design on the nail surface
   a control unit comprising:
      connection to communicate with the optical device,
      a computer application comprising instructions for controlling the motor according to the image of the nail surface acquired and according to the design, in such a way as to direct the print head in order that it applies said design on the nail surface,
   the system comprising:
      at least one remote server of the apparatus, said server comprising at least one database wherein digital data is recorded,
      a series of terminals belonging to a user community, each said terminal comprising at a camera or design software for generating a design in the form of digital data, each said terminal communicating, by the intermediary of an internet network, with the remote server, in such a way that said data generated is transmitted to said remote server,
   the remote server comprises a computer application comprising instructions to store in a hierarchical way the digital data received, said data being stored in memory zones, of the database, said memory zones are associated with each of the users of the community and can be accessed via password and/or identifier,
   the control unit has the form of a touch-screen tablet connected in a removable manner to the apparatus, said tablet communicating, by the intermediary of an internet network, with the remote server, in such a way that said tablet can access at least one of the memory zones and download the digital data which is stored therein, said downloaded data corresponding to the design to be applied on the nail surface.

2. System according to claim 1, wherein the touch-screen tablet displays the digital data contained in the memory zone of the remote server, in the form of designs which can be accessed in a digital library.

3. System according to claim 1, wherein the touch-screen tablet comprises a computer application comprising instructions for:
   controlling the optical device to acquire, in the form of digital data, an image of the nail surface whereon the design is applied,
   transferring to the remote server, the digital data acquired.

4. System according to claim 3, wherein the remote server comprises a computer application comprising instructions for storing the digital data received, in the memory zone associated with the user of the touch-screen tablet connected to the apparatus.

5. System according to claim 3, wherein the remote server comprises a computer application comprising instructions for storing the digital data received, in each of the memory zones or in the memory zones of users of the community selected beforehand.

6. System according to claim 1, wherein:
the apparatus is associated with a unique identifier,
at the end of the application of a design on a nail surface, the touch-screen tablet transmits to the remote server information comprising the unique identifier of the apparatus, in such a way that said remote server can account for the number of designs applied by said apparatus.

7. System according to claim 6, wherein:
the remote server comprises a computer application comprising instructions for generating, at a predetermined regular time interval, an electronic invoice that takes into account the number of designs accounted for in this interval,
the remote server automatically transmitting the electronic invoice generated, to a paying organization.

8. System according to claim 1, wherein:
the touch-screen tablet is associated with a unique identifier,
at the end of the application of a design on a nail surface, the touch-screen tablet transmits to the remote server information comprising this unique identifier, in such a way that said remote server can account for the number of designs downloaded by said tablet and applied by the apparatus.

9. System according to claim 7, wherein:
the remote server comprises a computer application comprising instructions for generating, at a predetermined regular time interval, an electronic invoice that takes into account the number of designs accounted for in this interval, and
the remote server automatically transmits the electronic invoice generated, to a paying organization.

10. System according to claim 1, wherein the remote server is connected to several apparatuses for applying a design on at least one nail surface.

11. Method for applying a design on at least one nail surface, comprising:
positioning at least one nail surface on a print head of an apparatus,
acquiring an image of the nail surface,
displacing the print head according to the image of the nail surface acquired and according to the design, in such a way as to apply said design on the nail surface, said method comprising:
generating several designs in the form of digital data, said designs being generated by a user community,
transmitting this data to at least one remote server of the apparatus and storing it in a hierarchical way in memory zones each associated with each of the users of the community and which can be accessed via password and/or identifier,
connecting in a removable manner a touch-screen tablet to the apparatus, said tablet acting as a control unit of said apparatus,
accessing, from the tablet, at least one of the memory zones of the remote server and downloading the digital data that is stored therein, said data downloaded corresponding to the design to be applied on the nail surface.

* * * * *